(12) United States Patent
Kopp

(10) Patent No.: US 8,074,940 B2
(45) Date of Patent: Dec. 13, 2011

(54) CONTROL STICK ADAPTED FOR USE IN A FLY-BY-WIRE FLIGHT CONTROL SYSTEM, AND LINKAGE FOR USE THEREIN

(75) Inventor: John D. Kopp, West Seneca, NY (US)

(73) Assignee: Moog Inc., East Aurora, NY (US)

( * ) Notice: Subject to any disclaimer, the term of this patent is extended or adjusted under 35 U.S.C. 154(b) by 398 days.

(21) Appl. No.: 12/311,125

(22) PCT Filed: Aug. 8, 2007

(86) PCT No.: PCT/US2007/017605
§ 371 (c)(1),
(2), (4) Date: Mar. 19, 2009

(87) PCT Pub. No.: WO2009/020453
PCT Pub. Date: Feb. 12, 2009

(65) Prior Publication Data
US 2010/0011897 A1    Jan. 21, 2010

(51) Int. Cl.
*B64C 13/12* (2006.01)
(52) U.S. Cl. ............ 244/229; 244/221; 244/234
(58) Field of Classification Search .......... 244/234, 244/221, 237; 74/471 XY, 318, 469; 318/649, 318/568.11, 561
See application file for complete search history.

(56) References Cited

U.S. PATENT DOCUMENTS

| | | | | |
|---|---|---|---|---|
| 4,134,560 A * | 1/1979 | Messerschmidt | ............. | 244/234 |
| 4,865,277 A * | 9/1989 | Smith et al. | .................. | 244/234 |
| 5,149,023 A * | 9/1992 | Sakurai et al. | ................ | 244/229 |
| 5,436,640 A * | 7/1995 | Reeves | ........................... | 345/161 |
| 5,503,040 A * | 4/1996 | Wright | .................... | 74/471 XY |
| 5,559,432 A * | 9/1996 | Logue | ....................... | 324/207.17 |
| 5,831,554 A * | 11/1998 | Hedayat et al. | ................. | 341/20 |
| 6,512,344 B1* | 1/2003 | Konno et al. | ................. | 318/560 |
| 2003/0125119 A1* | 7/2003 | Jones | .............................. | 472/60 |
| 2005/0093821 A1* | 5/2005 | Massie et al. | ................. | 345/161 |
| 2007/0018958 A1* | 1/2007 | Tavakoli et al. | .............. | 345/161 |

\* cited by examiner

*Primary Examiner* — Timothy D Collins
*Assistant Examiner* — Medhat Badawi
(74) *Attorney, Agent, or Firm* — Phillips Lytle LLP

(57) ABSTRACT

This invention provides an improvement in a control stick (e.g., joystick, side-stick, etc.) (20) adapted to control the movement of an object (e.g., an airfoil surface). The improvement includes: a support (21); an intermediately-pivoted upper member (23) mounted on the support, the upper member having an upper portion (24), and lower portion (25); an intermediate member (26) having an upper portion pivotally connected to the upper member lower portion, and having a lower portion; and a lower member (29) having a lower portion pivotally mounted on the support, and having an upper portion; and wherein the intermediate member lower portion is movably mounted on the lower member upper portion such that pivotal movement of the upper member upper portion relative to the support will produce pivotal movement of the intermediate and lower members relative to the support; and a resilient member (31) arranged to bias the direction of relative movement between the intermediate and lower members. The various pivotal connections may be provided by gimbals such that the various members arc mounted for compound pivotal movement about two mutually-perpendicular axes.

15 Claims, 5 Drawing Sheets

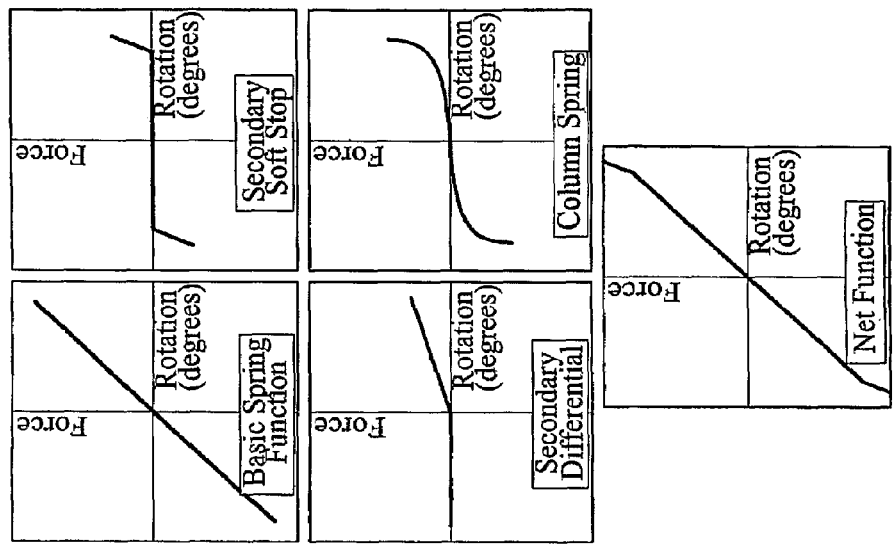
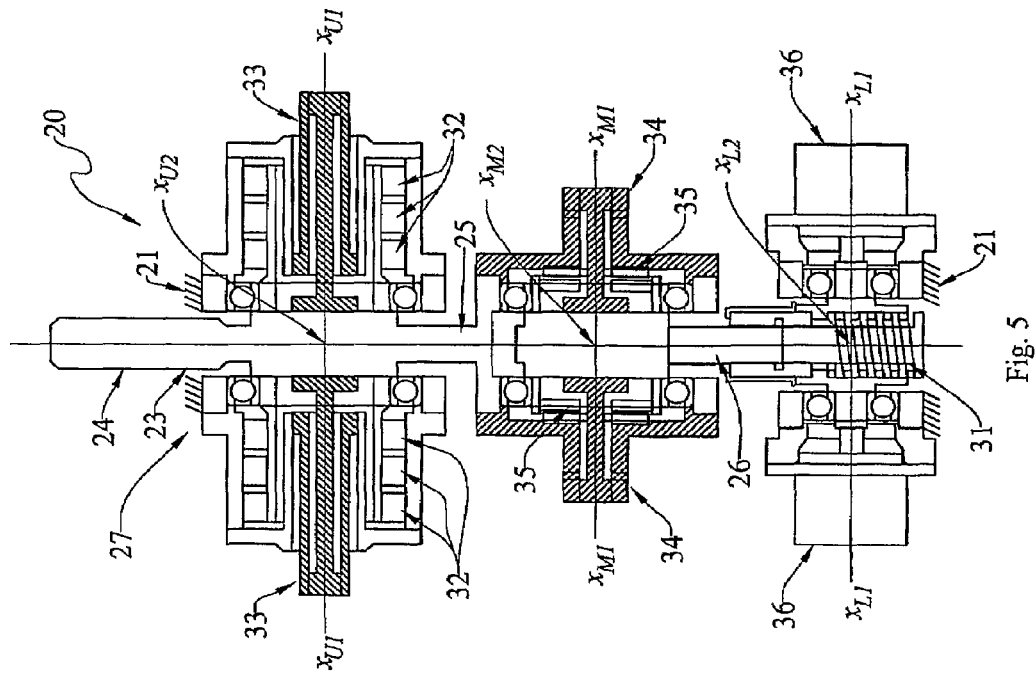
Fig. 6
Fig. 5

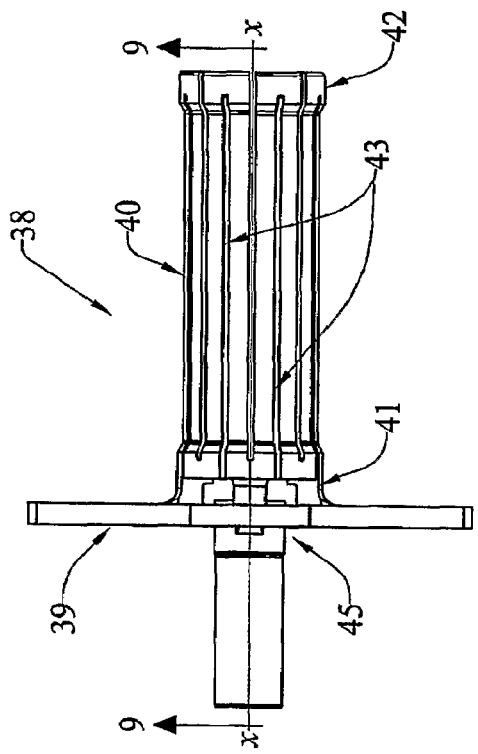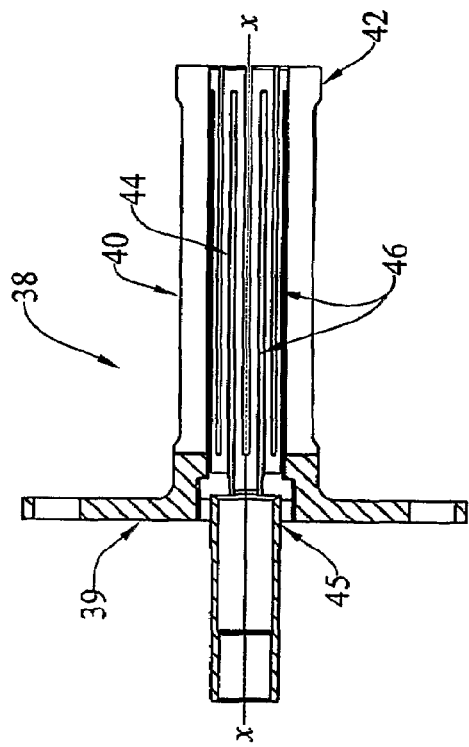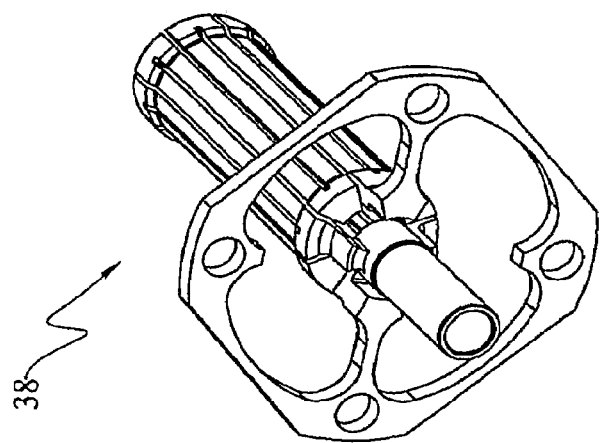

CONTROL STICK ADAPTED FOR USE IN A FLY-BY-WIRE FLIGHT CONTROL SYSTEM, AND LINKAGE FOR USE THEREIN

TECHNICAL FIELD

The present invention relates generally to the field of control sticks (e.g., joysticks, side-sticks, etc.) that are adapted for use in sensing and transmitting manual operator commands to an object-to-be-moved (e.g., airfoil surfaces, etc.) in response to such commands, to improved linkages for use in mounting such control sticks on suitable supports, and to improved compound springs that are particularly adapted for use therein. One particular application contemplates the transmittal of pilot or co-pilot commands to various airfoil surfaces by a fly-by-wire flight control system.

BACKGROUND ART

Joysticks are well-known devices to transfer a pilot's manual input commands to various aircraft flight control surfaces. In their early forms, joysticks were usually mounted on the cockpit floor between the pilot's legs. They were typically mounted so as to enable compound pivotal movement of the stick about two mutually-perpendicular axes, representing the pitch and roll axes of the aircraft. However, the position and size of these joysticks often interfered with other devices and freedoms, and required considerable space to accommodate the range of permissible movement of the handle.

Originally, such joysticks were connected to various airfoil surfaces by mechanical linkages and cables. These couplings were unnecessarily heavy and bulky, and did not readily allow for redundancy.

As the performance, control and sophistication of aircraft have increased, fly-by-wire systems have been developed. In these systems, various manual inputs to the joystick handle are first transduced into electrical signals, and these are then transmitted along various redundant paths to one or more computers, and then to remotely-located motors and drivers that control movement of the various airfoil surfaces. Thus, mechanical transmittals from joysticks and column wheels have given way to electrical transmittals from transducers associated with the sticks.

In more recent years, side-sticks have been developed. These are typically mounted ahead of an arm rest located on the outboard sides of the pilot's and co-pilot's seats. The pilot is typically seated in the left seat, and the co-pilot in the right seat. Thus, the pilot's side-stick us usually to his left, and the co-pilot's side-stick us usually to his right. Hence, the pilot will typically rest his left arm on his left arm rest, and will control his side-stick with his left hand, while the co-pilot will typically rest his right arm on his right arm rest, and will control his side-stick with his right hand. In many cases, the tilting of the stick about the appropriate axis was sensed as a function of position (see, e.g., U.S. Pat. Nos. 5,125,602 and 5,291,113). In other cases, it was sensed as a function of force or torque (see, e.g., U.S. Pat. Nos. 6,028,409; 5,694,010 and 5,347,204).

Some of these side-sticks have been mounted on gimbals to allow for omni-directional or compound pivotal movement about the pitch and roll axes (see, e.g., U.S. Pat. Nos. 5,291, 113 and 5,694,014).

Side-sticks are typically thought of as being either "passive" or "active". A "passive" side-stick unit ("PSSU") senses the pilot's or co-pilot's pitch and roll commands as functions of the tilting displacement of the associated control stick about the appropriate axes. These commands are then supplied to one or more flight control computers, which, in turn, control the movement of various airfoil surfaces to control the pitch and roll of the aircraft. The control stick may supply redundant command signals to the computer. Some of these devices use various springs to apply various force-feel gradients to the handle of the control stick to afford the pilot and copilot a tactile sensation and feel of various conditions (see, e.g., U.S. Pat. No. 5,125,602).

An "active" side-stick unit ("ASSU") is similar to a PSSU, but further incorporates motors to couple the positions of the pilot's and co-pilot's side-sticks. If the pilot is actively controlling the aircraft, and the co-pilot has his hand off his stick, the co-pilot's stick will be back-driven to follow and duplicate the various positional movements that the pilot supplies to his stick. Thus, the pilot's and co-pilot's sticks will tilt simultaneously in parallel and in unison, as if one were slaved to the other. Conversely, if the co-pilot is actively controlling the aircraft, and the pilot has his hand off his stick, the pilot's stick will follow and duplicate the positional commands supplied by the co-pilot to his stick. This is sometimes known as "position recopying" (see, e.g., U.S. Pat. No. 5,125,602), or an "electrical cross-cockpit interconnect" (see, e.g., U.S. Pat. No. 5,456,428), or simply "cross-coupling" (see, e.g., U.S. Pat. No. 5,694,014).

If the aircraft is provided with an autopilot, the autopilot may generate electrical signals that are supplied to the motors associated with the pilot's and co-pilot's control sticks to back-drive both of these sticks.

It is also known to provide such side-sticks with various feedback force sensations that simulated the "feel" of the resistance of the airfoil surfaces to the various input commands, or the transitions between various operational conditions, or even a vibration in the case of an emergency. It is also known to damp such control sticks so as to impede the stick from freely moving from a manually-commanded position if the operator were to let go of the stick (see. e.g., U.S. Pat. Nos. 5,125,602; 6,459,228 and 4,069,720). The aggregate disclosures of each of the foregoing patents is hereby incorporated by reference.

However, the column wheels, joysticks and side-sticks developed heretofore have involved various mechanical linkages and couplings that have introduced friction, backlash, and the like into the movement of the control stick. These designs are believed to have been heavy and bulky. They are believed to have interfered with the smooth continuous transmission of manual pilot input signals from the control stick to the flight control computer, and with the smooth continuous transmission of various electrical signals to back-drive the control stick in accordance with the electrically-commanded movements and forces.

Accordingly, there is believed to be a demonstrated and long-felt need to provide improved control sticks that are adapted for use in both "passive" and "active" fly-by-wire flight control systems, and for improved linkages for use with such improved control sticks, and for improved compound torsional springs for possible use therein.

DISCLOSURE OF THE INVENTION

With parenthetical reference to the corresponding parts, portions or surfaces of the disclosed embodiment(s), merely for purposes of illustration and not by way of limitation, the present invention broadly provides an improved control stick (20), an improved linkage (27) for use in a control stick, and an improved compound spring (38).

In one aspect, the invention provides an improvement in a control stick (20) mounted on a support (21) and adapted to control the movement of an object (not shown). The improvement broadly includes: a support (21); and a linkage (27) for mounting a handle (24) on the support for selective compound pivotal movement about two mutually-perpendicular axes ($x_{U1}$-$x_{U1}$, $x_{U2}$-$x_{U2}$) to provide an input to the control stick. The linkage includes: a first gimbal (22) mounted on the support; an upper member (23) mounted on the first gimbal, the upper member having a handle (24) arranged above the first gimbal, and having a lower portion (25) arranged below the first gimbal; an intermediate member (26); a second gimbal (28) connecting the upper and intermediate members; and a lower member (29), one of the intermediate and lower members being movably mounted on the other of the intermediate and lower members to permit relative movement therebetween when the handle is moved relative to the support; a third gimbal (30) connecting the lower member to the support; and a resilient member (31), such as a column spring, arranged to bias the direction of relative movement between the intermediate and lower members. The handle may be grasped and selectively moved relative to the support to provide an input to the linkage.

The resilient member (31) may be arranged to exert a force that substantially removes all backlash from the linkage. The resilient member may urge the handle to move toward a null position relative to the support.

The improvement may further include an object-to-be-moved (e.g., an airfoil surface), and at least one transducer (32, 32, 32) mounted on the support to sense the position of a portion of the linkage and to produce an electrical signal proportional to such sensed position. The handle is adapted to be moved relative to the support to cause the transducer to provide a command signal for moving the object.

The improvement may further include a plurality of springs (33, 33, 34, 34) acting between the support and the linkage. These springs have different force-to-deflection characteristics. At least one of the springs may be a compound spring (38).

In the improved control stick, the extent of movement between the intermediate and lower members when the handle is moved off null may be a function of the ratio of (a) the distance (A) between the axes of the first and second gimbals, and (b) the distance (B) between the axes of the second and third gimbals, when the handle is in its null position. The angle of deflection between (i) an imaginary line joining the axes of the first and second gimbals, and (ii) an imaginary line joining the axes of the second and third gimbals, may be substantially equal to the sum of (a) the angle of deflection of the upper member relative to an imaginary line joining the axes of the first and third gimbals, and (b) the angle of deflection of the lower member relative to the imaginary line joining the axes of the first and third gimbals.

The improvement may further include a magnetic detent (35) acting between the support and the linkage for requiring that a force be exerted on the handle to move the handle off null.

The improvement may further include a damper (36) acting between the support and linkage for damping the velocity of the handle. This damper may be an eddy current damper.

The improvement may further include a motor (not shown) acting between the support and linkage for causing the linkage to move as a function of a signal supplied to the motor.

The improved control stick may be mounted on an aircraft having a fly-by-wire control system, and the improved control sticks may be mounted at the pilot's station and at the co-pilot's station. The pilot's and co-pilot's control sticks may be cross-coupled to move together. The aircraft may have an autopilot, and the pilot's and co-pilot's control sticks may be moved together in response to a signal supplied by the autopilot.

In another aspect, the invention provides an improvement in a control stick (20) adapted to control the movement of an object. The improvement includes: a support (21); an upper member (23) pivotally mounted on the support, the upper member having a lower portion (25) arranged below its pivotal connection with the support; an intermediate member (26) having an upper portion pivotally connected to the upper member lower portion, and having a lower portion; and a lower member (29) having a lower portion pivotally mounted on the support, and having an upper portion; and wherein the intermediate member lower portion is movably mounted on the lower member upper portion such that pivotal movement of the upper member upper portion relative to the support will produce pivotal movement of the intermediate and lower members relative to the support; and a resilient member (31) arranged to bias the direction of relative movement between the intermediate and lower members.

The upper member may be mounted on the support for pivotal movement about an axis ($x_{U1}$-$x_{U1}$, or $x_{U2}$-$x_{U2}$) intermediate the length of the upper member, the upper member may have an upper portion arranged above the axis and arranged to function as a handle (24), and the handle may be grasped and selectively manipulated to provide an input to the linkage.

The upper member may be mounted for compound pivotal movement about two mutually-perpendicular axes ($x_{U1}$-$x_{U1}$, $x_{U2}$-$x_{U2}$) relative to the support.

The force exerted by the resilient member may urge the upper member to move toward a null position relative to the support. The resilient member may be arranged to exert a force that substantially eliminates all backlash from the linkage. The force exerted by the resilient member may be adjustable.

The extent of movement between the intermediate and lower members when the upper member is moved off null may be a function of the ratio of (a) the distance (A) between the pivotal axis between the upper member and the support and the pivotal axis between the intermediate member and the support, and (b) the distance (B) between the pivotal axis between the intermediate member and the support and the pivotal axis between the lower member and the support, when the upper member is in its null position. The angle of deflection between (i) an imaginary line joining the axes of the first and second gimbals, and (ii) an imaginary line joining the axes of the second and third gimbals, may be substantially equal to the sum of (a) the angle of deflection of the upper member relative to an imaginary line joining the pivotal axis between the upper member and the support and the pivotal axis between the lower member and the support and (b) the angle of deflection of the lower member relative to the imaginary line joining the pivotal axis between the upper member and the support and the pivotal axis between the lower member and the support.

The upper member and the support may be connected by a universal joint, such as a gimbal mechanism (22).

The intermediate member (26) may be mounted for compound pivotal movement about two perpendicular axes ($x_{M1}$-$x_{M1}$, $x_{M2}$-$x_{M2}$) relative to the upper member.

The upper and intermediate members may be connected by a universal joint, such as a gimbal mechanism (28).

The lower member (29) may be mounted for compound pivotal movement about two mutually-perpendicular axes ($x_{L1}$-$x_{L1}$, $x_{L2}$-$x_{L2}$) relative to the support.

The lower member and the support may be connected by a universal joint, such as a gimbal mechanism (30).

The intermediate member lower portion may be slidably received in the lower member upper portion.

The resilient member may contribute to the force-feel gradient of the handle portion.

The improvement may further include at least one first position sensor (32, 32, 32) mounted on the support and engaging the upper member lower portion for providing a first output signal as a function of the position of the upper member lower portion about one of the axes, and possibly at least one second displacement sensor (32, 32, 32) mounted on the support and engaging the upper member lower portion for providing a second output signal as a function of the position of the upper member lower portion about the other of the axes.

The improvement may further include a first upper spring (33), such as a compound spring, acting between the upper member and support for affecting the force required to move the handle about one of the axes, and possibly a second upper spring (33), such as a compound spring, acting between the upper member and support for affecting the force required to move the handle about the other of the axes.

The improvement may further include a first intermediate spring (34), such as a compound spring, acting between the intermediate member and support for affecting the force required to move the handle about one of the axes, and possibly a second intermediate spring (34), such as a compound spring, acting between the intermediate and support for affecting the force required to move the handle about the other of the axes. The first intermediate spring provides a distinct change in the force-feel gradient to alert an operator of a change in the displacement of the handle.

The improvement may further include a breakout device (35) for exerting a small force on the intermediate member that is required to be overcome for an operator grasping the handle to break out of the null position. The breakout device may include a plurality of magnets mounted on the support and intermediate member.

The improvement may further include a damper (36) acting on the lower member to damp the velocity of the handle. The damper may be an eddy current damper.

In another aspect, the invention provides a control stick (20) which broadly includes: a support (21); a linkage (27) having a handle (24) and being mounted on the support; and a plurality of position sensors (32, 32, 32) mounted on the support and engaging the linkage at various locations thereon, each of the position sensors being adapted to produce an output signal as a function of the position of the linkage locations relative to the support; a plurality of springs (33, 33, 34, 34) acting between the support and linkage for affecting the force-feel characteristics of the linkage; a magnetic detent (35) acting between the support and linkage for requiring an operator to apply a force to the handle to move the handle off null; and a damper (36) acting between the support and linkage for damping the velocity of the handle.

Each of the springs may have its own individual force-to-deflection characteristic, and the force-feel characteristic of the linkage may be a function of the various individual force-to-deflection characteristics of the springs. In the preferred embodiment, the force-feel characteristic of the linkage is a function of the sum of the various individual force-to-deflection characteristics of the springs and the geometry of the linkage.

The springs may urge the handle to move toward a null position relative to the support, and one of the springs may be arranged to exert a force that substantially removes all backlash from the linkage.

In still another aspect, the invention provides a compound spring (38), which broadly includes: a first tubular portion (40) having a first wall extending between a first end (41) and a second end (42); at least one first slot (43) extending through the first wall and defined between opposing slot walls such that when the first and second ends are rotated relative to one another, the spring will have one force-to-displacement characteristic when the slot walls are spaced from one another and will have another force-to-displacement characteristic when the slot walls contact one another; and a third force-to-displacement characteristic when the first and second ends are flexed relative to one another in a common plane.

The first slot may be elongated in a direction parallel to the longitudinal axis of the first tubular portion. There may be a plurality of the first slots, and these may be spaced circumferentially from one another about the first tubular portion.

The spring may further include a second tubular portion (44) arranged within the first tubular portion and having a second wall extending between the second end (42) and a third end (45). The second tubular portion may have at least one second slot (46) extending through the second wall and defined between opposing slot walls. The second slot may be elongated in a direction parallel to the longitudinal axis of the second tubular portion, and a plurality of the second slots may be spaced circumferentially from one another about the second tubular portion.

The third end (45) may be arranged proximate the first end (41).

Accordingly, the general object of the invention is to provide an improved control stick.

Another object is to provide an improved linkage for use in a control stick.

Still another object is to provide an improved compound spring that is particularly adapted for use in a control stick.

These and other objects and advantages will become apparent from the foregoing and ongoing written specification, the drawings and the appended claims.

BRIEF DESCRIPTION OF THE DRAWINGS

FIG. 5 is a simplified schematic of the control stick linkage, showing the various springs, sensors and dampers acting between the support and the various members.

FIG. 6 is a series of plots of force (ordinate) vs. rotation angle (abscissa) characteristics of the basic spring, the soft-stop and differential functions of the secondary springs, the column spring, and further showing the added or superimposed function of all of the foregoing springs.

FIG. 7 is an isometric view of one form of an improved compound torsional spring.

FIG. 8 is a side elevation of the spring shown in FIG. 7.

FIG. 9 is a horizontal sectional view thereof, taken generally on line 9-9 of FIG. 8.

DESCRIPTION OF THE PREFERRED EMBODIMENTS

Figure 1:
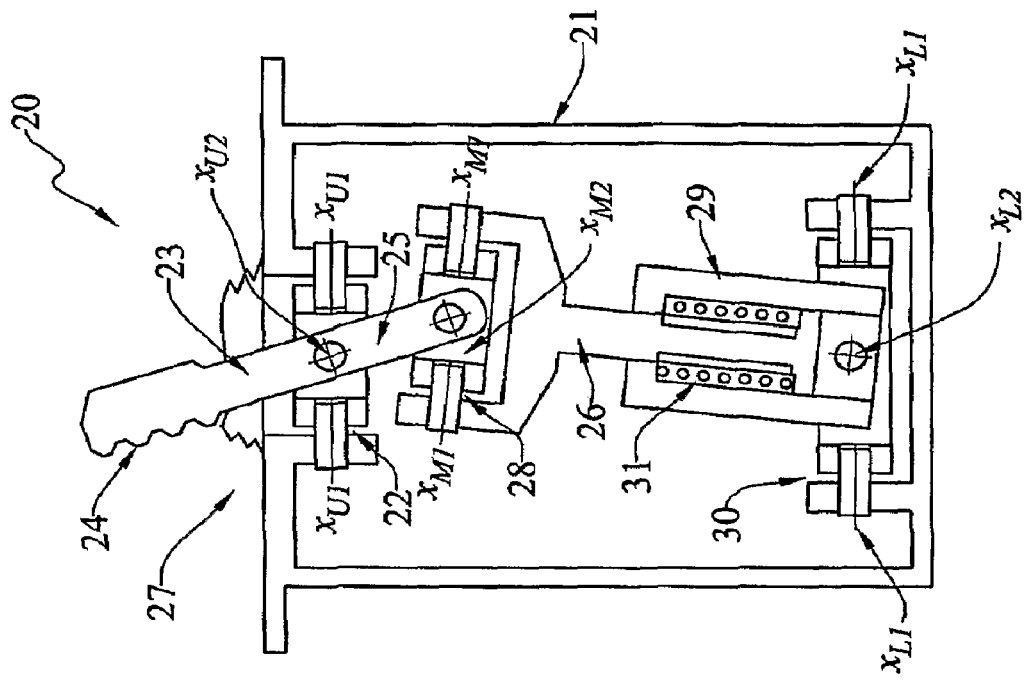
FIG. 1 is a schematic view of one form of mechanical linkage of an improved control stick, this view showing the positions of the upper, intermediate and lower members when the handle is in its null position relative to the support.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, the present invention provides certain improvements in a control stick. Such a control stick might be a joystick, a side-stick, or some other type of control device for remotely controlling an object. In the accompanying drawings, the improved control stick is depicted as being a being a side-stick for use with an aircraft to control the various airfoil surfaces thereon. However, this is only illustrative and is not limitative of the scope of the appended claims.

Figure 2:
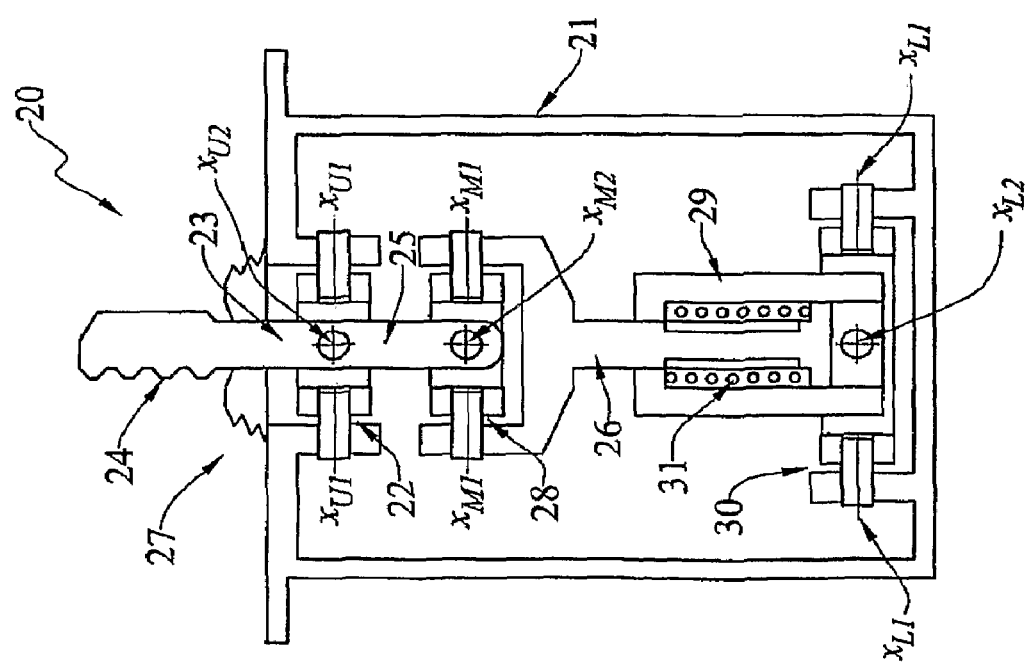
FIG. 2 is a schematic view of the structure shown in FIG. 1, but showing the positions of the upper, intermediate and lower members after the handle has been moved to an off-null position.

One form of the mechanical linkage of the improved control stick is shown principally in FIGS. 1, 2 and 5.

Referring now to FIGS. 1 and 2, the improved control stick, generally indicated at 20, is shown as being mounted on a suitable support, generally indicated at 21. In an aircraft environment, the control stick 20 would typically be mounted in the cockpit of an aircraft, and used to control the movement of a remote object, such as the flaps, rudders and ailerons.

The arrangement in shown in FIGS. 1 and 2 schematically depicts the linkage (27) as including a three-gimbal mechanism. As used herein, a "gimbal" is a device having two rings mounted at right angles to one another so that an object may remain suspended therein, regardless of movement of the support on which it is mounted. It is one particular species of a broader class of joints and connections that allow compound pivotal movement about two mutually-perpendicular axes. Other joints and connections of this class include universal joints, ball-and-socket joints that allow for omni-directional pivotal movement of one member relative to another, and the like. More particularly, the improved linkage broadly includes a first or upper gimbal 22. An upper member 23 is mounted on the first gimbal mounted on the support for compound pivotal movement about mutually-perpendicular axes $x_{U1}$-$x_{U1}$ and $x_{U2}$-$x_{U2}$. The upper member has a handle 24 arranged above the first gimbal, and has a lower portion 25 arranged below the first gimbal. The linkage is shown as further including an intermediate member 26, and a second gimbal 28 connecting the upper marginal end portion of the intermediate member with the lower marginal end portion of the upper member for compound pivotal movement about mutually-perpendicular axes $x_{M1}$-$x_{M1}$ and $x_{M2}$-$x_{M2}$. The device is further shown as having a lower member 29. One of the lower and intermediate members is movably mounted on the other of the intermediate and lower members. In the arrangement shown, the lower marginal end portion of intermediate member 26 is slidably and telescopically received in lower member 29, but this arrangement could be reversed if desired. The lower marginal end portion of lower member 29 is mounted on the support by a third gimbal 30 for compound pivotal movement about mutually-perpendicular axes $x_{L1}$-$x_{L1}$ and $x_{L2}$-$x_{L2}$. A coil spring 31 is arranged to act between the lower and intermediate members. This spring is in constant compression, and continually urges the intermediate member to move downwardly relative to the lower member. This has the practical effect of removing substantially all backlash from the three-member linkage.

The mechanical linkage is shown in FIG. 1 as being in a centered or null position relative to the support. In this position, the longitudinal axes of all three members 23, 26 and 29 are vertically aligned. In FIG. 2, the uppermost handle is shown as having been tilted leftwardly relative to the support, with a concomitant rightward movement of the lower marginal end portion of the upper member. Note also that this motion is accommodated by pivotal movement of the intermediate and lower members about axis $x_{L2}$-$x_{L2}$, and by axial movement of the intermediate member relative to the lower member, and by additional compressive displacement of spring 31.

As noted above, while the present invention has been shown as being implemented in the form of a side-stick for a pilot and co-pilot, persons skilled in this art will readily appreciate that such a mechanism might be implemented in the form of a joystick, or some other type of control stick for controlling an object. The object itself might be the airfoil surfaces of an aircraft, or some other object.

Figure 3:
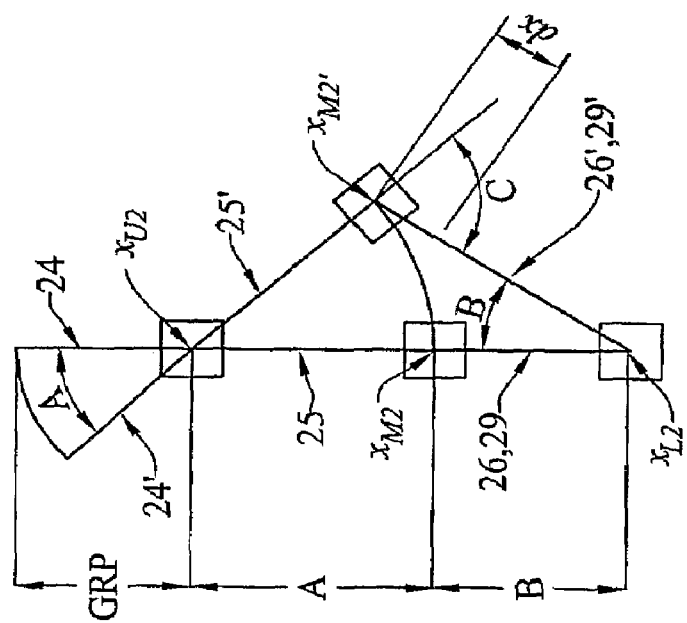
FIG. 3 is a simplified schematic showing the angles between the various linkage members when the handle has been moved to an off-null position.

FIG. 3 is a further simplified schematic of the linkage when the handle has been displaced off null. While a gimbal mechanism allows for compound pivotal movement about two mutually-perpendicular axes, the embodiment schematically shown in FIG. 3 depicts motion in about only one such axis for each gimbal. The upper pivot point of the first gimbal is indicated at $x_{U2}$, the intermediate pivot point of the second gimbal is indicated at $x_{M2}$, and the pivot point of the lower gimbal is indicated at $x_{L2}$, so as to be consistent with the foregoing nomenclature. The link between intermediate and lower pivots $x_{M2}$ and $x_{L2}$ is indicated by reference numerals 26, 29 when in the null position, this being the combined effective length of the intermediate and lower members, and by reference numerals 26', 29' when in the illustrated off-null position.

When the handle is in its null position, the linkage is vertically aligned, as shown more clearly in FIG. 1. In FIG. 3, the distance between the upper and intermediate pivots 31, 32 is indicated by distance A, and the distance between the intermediate and lower pivots $x_{M2}$, $x_{L2}$ is indicated by distance B. When the handle is displaced from the null position to an off-null position, as indicated at 24', the lower end of the upper member will swing to the position indicated at 25', and the intermediate and lower members will move to the alternative positions indicated by 26', 29'. Angle A represents the included angle of the displaced handle off null. Angle B represents the included angle of the axis of intermediate and lower members 26', 29' off null. Angle C is the sum of angles A and B. Dimension dx represents the extension of the intermediate member relative to the lower member when these two members move from the null position to the off-null position, as accommodated by further compression of spring 31. The equations for Angles B and C, and distance dx are as follows:

$$AngleB = \tan^{-1}\left[\frac{\sin(AngleA) \times A}{B + (A - \cos(AngleA) \times A)}\right]$$

$$AngleC = AngleA + AngleB$$

$$dx = \left[\frac{\sin(AngleA) \times A}{\sin(AngleB)}\right] - B$$

Figure 4:
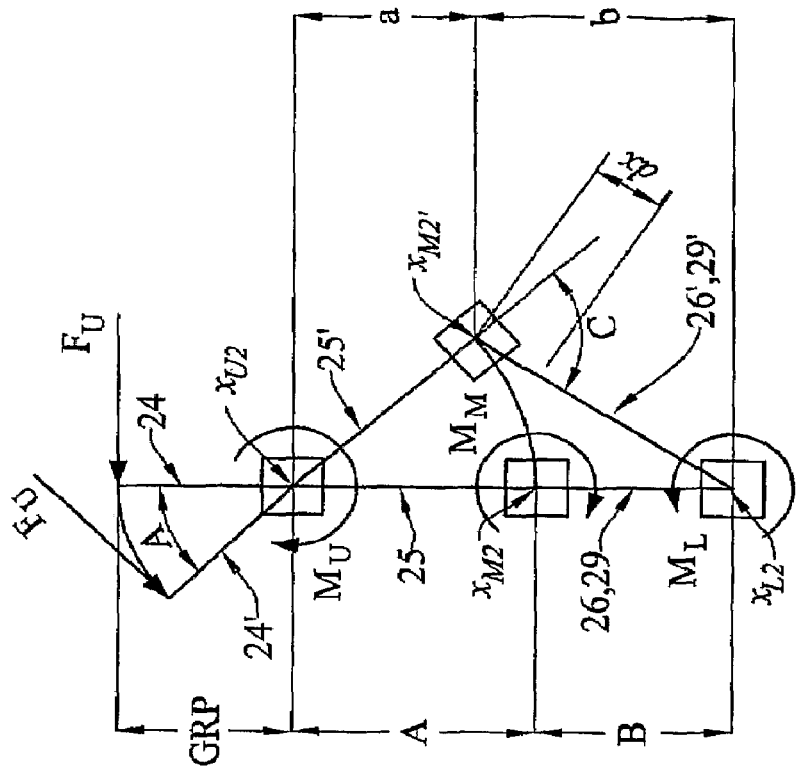
FIG. 4 is a simplified schematic showing the forces and moments acing on the various linkage members when the handle has been moved to an off-null position.

Referring now to FIG. 4, a force $F_u$ exerted by the pilot's hand through the arm distance, GRP, of the grip, will create an upper moment $M_U$ about upper pivot point $x_{U2}$. The force exerted at the second pivot point will be a function of distances a and b. The moment about the middle pivot, $x_{M2}$, is calculable. Similarly, the force exerted on the intermediate pivot point is also calculable. These relationships are expressed by the following equations:

$$F_U = \frac{M_U}{GRP}$$

$$F_L = \frac{M_U \times a}{GRP \times b}$$

$$M_M = -F_M \times (GRP + A) - F_M + A$$

$$M_M = -F_U[(GRP + A) + A]$$

$$F_M = \frac{M_M}{(GRP + 2 \times A)}$$

Thus, the extent of movement between the intermediate and lower members when the handle is moved off null is a function of the ratio of (a) the distance between the axes of the first and second gimbals, and (b) the distance between the axes of the second and third gimbals. The angle of deflection between an imaginary line joining the axes of the first and second gimbals and an imaginary line joining the axes of the second and third gimbals is substantially equal to the angle of deflection of the upper member relative to an imaginary line joining the axes of the first and third gimbals and the angle of deflection of the lower member relative to an imaginary line joining the axes of the first and third gimbals when the handle in its null position.

FIG. 5 is a schematic view of the improved control stick 20, but further showing the various springs, sensors and dampers attached thereto. In FIG. 5, the linkage 27 is again shown as including an upper member 23 having an upper handle 24 and a lower arm 25, an intermediate member 26, and a lower member 29. The lower marginal end portion of the intermediate member is depicted as being telescopically received in lower member 29. Coil spring 31 continuously urges the intermediate member to move downwardly relative to the lower member. In FIG. 5, the linkage is shown as being mounted for movement in only one plane, this being for simplicity of illustration. Upper member 23 is mounted on the support 21 for pivotally movement about axis $x_{U2}$. The upper marginal end portion of the intermediate member is pivotally connected to the lower marginal end portion of the upper member for pivotal movement about axis $x_{M2}$. Finally, the lower member 29 is pivotally mounted on the support for movement about axis $x_{L2}$. It should be clearly understood that this arrangement may include the three-gimbals, although the details of such gimbals is not fully shown.

In FIG. 1, movement of the upper member 23 is sensed by three redundant position sensors, severally indicated at 32. Three of these position sensors are located at diametrically opposite positions. There would also be three additional positions sensors on either side of the upper member in a plane coming out of the paper as well. The function of these position sensors is to sense and determine the extent of tilting movement of the upper member relative to the support. There are three of such position sensors to provide triple redundancy.

Within the position sensors, there are a plurality of opposing compound torsional springs, severally indicated at 33. Here again, two opposing torsional springs are depicted in FIG. 5, and there are an additional two opposing springs in the plane coming out of the paper. The function of these springs is to provide some force-feel resistance to tilting movement of the handle. The structure and operation of these compound torsional springs is shown more clearly in FIGS. 7-9, and described infra.

Certain additional torsional springs, indicated at 34, 34 are active between the upper and intermediate members to provide certain secondary spring functions, and soft stops. This arrangement may also include a magnetic detent, indicated at 35 that would affirmatively require that the pilot exert some force to move the linkage off null.

Still referring to FIG. 5, opposed eddy current dampers, severally indicated at 36, are arranged to act between the support and the lower member to damp the velocity of movement of the linkage. Here again, there are actually four velocity dampers, arranged in opposing pairs.

FIG. 6 illustrates the individual functions of the various springs shown in FIG. 5, and illustrates graphically the net function attributable to their summation. The basic spring function is depicted as being a straight line between the ordinate (force) and the abscissa (rotation). The secondary springs 34 provide the soft-stop and differential functions as indicated in FIG. 6. The column spring 31 has the illustrated force-to-displacement characteristics shown. The curve labeled "net function" is obtained by superimposing the other four curves shown in FIG. 6. FIG. 6 illustrates that the various springs may be carefully selected so that their properties, when superimposed may give whatever net function is desired.

Referring now FIGS. 7-9, one of the compound torsion springs is generally indicated at 38. This spring is shown as having a mounting flange 39 which is adapted to be connected to suitable structure, depending upon its application. The spring further has a first tubular portion, indicated at 40, which is connected to the flange which has a first end 41 connected to the flange and extends rightwardly therefrom to a second end 42. This first tubular portion is shown as having at least one longitudinal slot, indicated at 43. In the form shown, the first tubular portion has a plurality of such slots, and these are spaced circumferentially about the first tubular portion.

Figure 10:
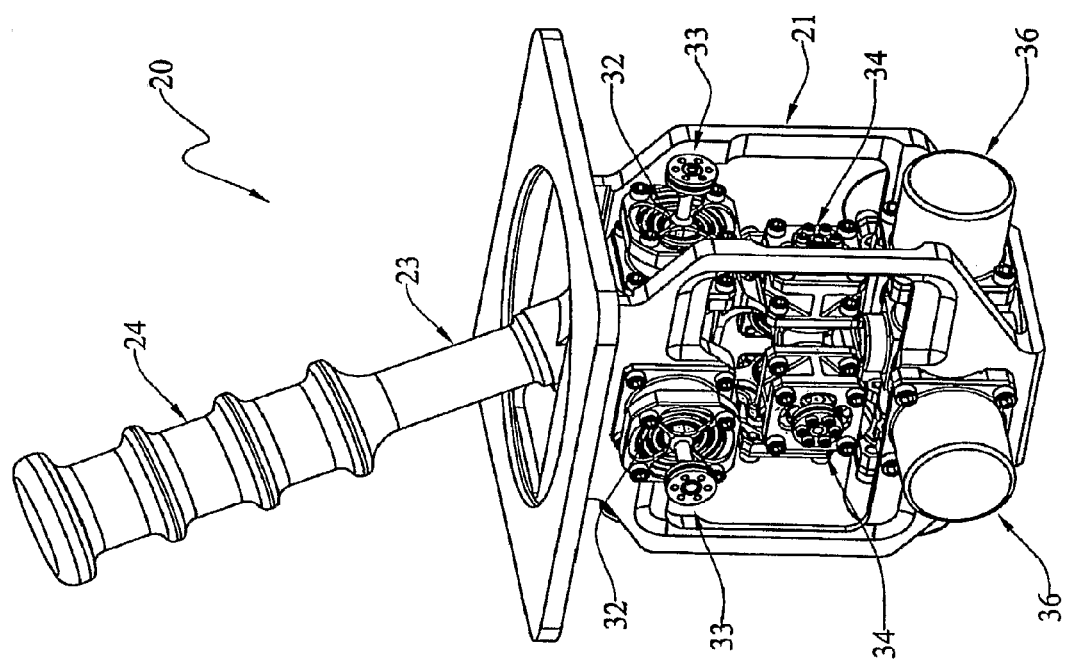
FIG. 10 is an isometric view of a commercial form of the improved control stick with the handle shown as having been tilted to an off-null position, this view showing the compactness of the packaging of this particular embodiment.

The spring may also have a second tubular portion 44 within the first tubular portion 40. The second tubular portion is physically connected to the first tubular portion at second end 42, and extends leftwardly within the first tubular portion to a third end 45. Second tubular portion 44 has at least one longitudinally extending slot 46. In the form shown, there are a plurality of such slots 46, these are circumferentially spaced from one another about the second tubular portion. The reason for the slots is to afford the capability of having one force-to-displacement characteristic when a torsional force is exerted on the spring between the first end and the third end before the opposing slot walls physically contact one another, and a second force-to-displacement characteristic after such slot walls do contact with one another. In effect, the two tubular portions are mechanically connected in series, although the second is arranged within the first. The circumferentially spacing between the opposed longitudinally extending walls of the slots may be the same or different between the two tubular portions, depending on the particular force-to-displacement characteristics desired. Moreover, one unique feature of the improved spring is that it is not a pure torsional spring. Rather, it may act as a torsional spring, and may also be subjected to flexure in a plane, such as the plane of the paper. The various torsional springs shown in FIG. 5 may be selectively designed to afford the particular force-to-displacement characteristics desired, so as to contribute to the overall net function of the device. Another unique feature of the compound spring is that by having the inner tube positionally reversed on the outer tube, the spring is axially compact. This affords great advantages, because it allows the capability of providing the control stick within a small package or envelope, as shown in FIG. 10.

Therefore, the present invention provides an improved control stick, an improved linkage for use therein, and an improved compound spring.

MODIFICATIONS

The present invention contemplates that many changes and modifications may be made. For example, while one form utilizes a three-gimbal mechanical linkage with the various members, other types of connections might alternatively be used. Indeed, the connection could be simplified to a type of socket joint, a universal joint, or some other joint. Indeed, while the principal advantage of these forms is that such joints and connections allow for compound pivotal movement of the handle about mutually perpendicular axes, in alternative arrangements other types of linkages might be used. In some cases, the linkage may be affected by the geometry of the links.

The column spring is deemed particularly useful for removing substantially all of the backlash from the linkage. In effect, it continuously biases the linkage so as to remove the feeling of backlash. However, such column spring, while desired, is not absolutely critical.

Shown in FIG. 6, different types of springs, sensors and dampers may be associated with different parts of the linkage. While the primary springs 33 are associated with the upper member and a secondary springs are associated with the intermediate member, this arrangement is not invariable, and may be changed. Also, the position of the eddy current dampers may be changed. Similarly, the location of the breakaway detents 35 may also be changed or modified, as desired.

The compound torsional spring is also deemed to be unique. This spring is deemed to be a compound spring in the sense that it is operatively arranged to resist both torsion about its axis x-x, and flexure in a particular plane, such as (but not limited to) the plane of the paper. In its simplest form, the torsional spring simply has one tubular portion provided with at least one, but preferably a plurality of circumferentially-spaced longitudinally-extending slots. The function of these slots is so that the spring will have one force-to-displacement characteristic when the second end is rotated relative to the first end and before the slot walls contact one another, and a second and different force-to-displacement characteristic after the slot walls contact one another. By spacing the slots circumferentially about the first tubular portion, the spring is more symmetrical, and has similar properties to resist flexure in any particular direction. The spring may also have a reversed second portion within the first portion. Persons skilled in this art will readily appreciate that the first and second portions, being commonly connected at the second end, are mechanically connected in series with one another. However, the reversed inner or second portion allows for a compact arrangement, and this is deemed particularly useful where the size of the envelope is constrained, such as in an aircraft.

Therefore, while several simplified and progressively-more detailed embodiments of the invention have been shown and described, and several modifications and changes thereof discussed, persons skilled in this art will readily appreciate that various additional changes and modifications may be made without departing from the spirit of the invention, as defined and differentiated by the following claims.

What is claimed is:

1. In a control stick mounted on a support and adapted to control the movement of an object, the improvement comprising:
   a support;
   a linkage for mounting a handle on said support for selective compound pivotal movement about two mutually-perpendicular axes to provide an input to said control stick, said linkage including:
      a first gimbal mounted on said support;
      an upper member mounted on said first gimbal, said upper member having a handle arranged above said first gimbal, and having a lower portion arranged below said first gimbal;
      an intermediate member;
      a second gimbal connecting said upper and intermediate members; and
         a lower member, one of said intermediate and lower members being movably mounted on the other of said intermediate and lower members to permit relative movement therebetween when said handle is moved relative to said support;
         a third gimbal connecting said lower member to said support; and
      a resilient member arranged to bias the direction of relative movement between said intermediate and lower members;
      whereby said handle may be grasped and selectively moved relative to said support to provide an input to said linkage.

2. The improvement as set forth in claim 1 wherein said resilient member is arranged to exert a force that substantially removes all backlash from said linkage.

3. The improvement as set forth in claim 1 wherein said resilient member urges said handle to move toward a null position relative to said support.

4. The improvement as set forth in claim 1, and further comprising:
   an object to be moved; and
   at least one transducer mounted on said support to sense the position of a portion of said linkage and to produce an electrical signal proportional to such sensed position; and
   wherein said handle is adapted to be moved relative to said support to cause said transducer to provide a command signal for moving said object.

5. The improvement as set forth in claim 1, and further comprising:
   a plurality of springs acting between said support and said linkage.

6. The improvement as set forth in claim 5 wherein various springs have different force-to-deflection characteristics.

7. The improvement as set forth in claim 6 wherein at least one of said springs is a compound spring.

8. The improvement as set forth in claim 1 wherein the extent of movement between said intermediate and lower members when said handle is moved off null is a function of the ratio of (a) the distance between the axes of the first and second gimbals, and (b) the distance between the axes of the second and third gimbals, when said handle is in its null position.

9. The improvement as set forth in claim 1 wherein the angle of deflection between (i) an imaginary line joining the axes of the first and second gimbals, and (ii) an imaginary line joining the axes of the second and third gimbals, is substantially equal to the sum of (a) the angle of deflection of the upper member relative to an imaginary line joining the axes of the first and third gimbals, and (b) the angle of deflection of the lower member relative to said imaginary line joining the axes of the first and third gimbals.

10. The improvement as set forth in claim 1, and further comprising:
   a magnetic detent acting between said support and said linkage for requiring that a force be exerted on said handle to move said handle off null.

11. The improvement as set forth in claim 1, and further comprising:
   a damper acting between said support and linkage for damping the velocity of said handle.

12. The improvement as set forth in claim 11 wherein said damper is an eddy current damper.

13. The improvement as set forth in claim 1, and further comprising:
   a motor acting between said support and linkage for causing said linkage to move as a function of a signal supplied to said motor.

14. The improvement as set forth in claim 13 wherein said control stick is mounted on an aircraft having a fly-by-wire control system, wherein said control stick is mounted at a pilot's station and at a co-pilot's station, and wherein the pilot's and co-pilot's control sticks are cross-coupled to move together.

15. The improvement as set forth in claim 14 wherein said aircraft has an autopilot, and wherein said the pilot's and co-pilot's control sticks are moved together in response to a signal supplied by said autopilot.

* * * * *